W. R. JONES.
HOSE-COUPLING.
No. 185,326. Patented Dec. 12, 1876.
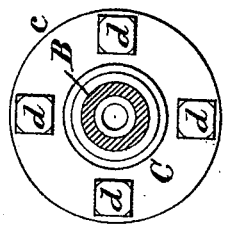
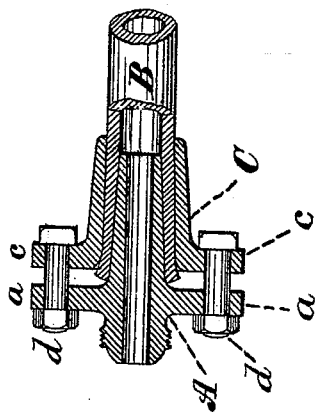
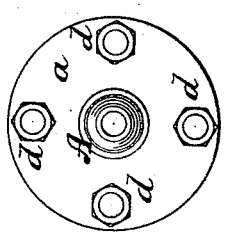
Witnesses
F. A. Pollock
G. Smith
William R. Jones, Inventor.
by Connolly Bros. & McTighe, Attorneys

UNITED STATES PATENT OFFICE.

WILLIAM R. JONES, OF BRADDOCK'S FIELD, PENNSYLVANIA.

IMPROVEMENT IN HOSE-COUPLINGS.

Specification forming part of Letters Patent No. 185,326, dated December 12, 1876; application filed October 16, 1876.

*To all whom it may concern:*

Be it known that I, WILLIAM R. JONES, of Braddock's Field, in the county of Allegheny and State of Pennsylvania, have invented certain new and useful Improvements in Hose-Couplings; and I do hereby declare the following to be a full, clear, and exact description of the invention, such as will enable others skilled in the art to which it pertains to make and use it, reference being had to the accompanying drawings, which form part of this specification, in which—

Figure 1 is a vertical longitudinal section, with hose attached. Fig. 2 is a front-end view. Fig. 3 is a rear-end view.

This invention relates to improvements in hose-couplings—that is, the device for uniting the hose to the joint; and consists in two flanged hollow conic frusta, the hose being stretched over the smaller one, and the larger one, which is smooth inside, being drawn tightly over it, the two flanges being adjustably connected by bolts or screws.

In the illustration, A designates the smaller or inner piece, with its collar or flange $a$, and it is provided with any of the usual forms of union with another section or bib-cock. Its outer surface is a frustum of a cone, as seen, and is smooth, with a rounded corner or fillet running from the surface onto the flange. This helps to spread the hose and give a firmer gripe. The hose B is pushed on over the cone, as far as possible. Outside the hose is placed a piece, C, similar to piece A, except that it is larger, and its inner surface is conical, being also smooth, having a collar, $c$. To effect a better hold on the hose the planes of both conical surfaces may converge toward the hose end, so that the tighter the flanges are drawn the stronger will be the bite on the hose. The two flanges $a$ and $c$ are drawn together by bolts or screws $d$, which can be readily placed or detached, when circumstances require. A cheap, neat, and reliable union is thus obtained, forming a steam, air, or water tight joint, which cannot be surpassed.

The chief advantage of this over other apparently similar couplings is that while others are drawn tight by direct threaded contact of the two cones, thereby grinding the edges into the hose, and cutting it through in the very act of screwing the cones together, in this case the contacting-surfaces are smooth and rounded, and are drawn together in the line of the axis without revolution. Consequently, with my invention, there being no rubbing contact by revolution of pieces, no abrasion or weakening of the hose can occur.

What I claim as new is—

1. The within-described coupling, consisting of the inner piece A formed with a smooth conical outer surface, and having the flange $a$, in combination with the piece C, formed with a smooth conical inner surface and flange, $c$, and the connecting screws or bolts $d$, substantially as set forth.

2. A coupling, consisting of two flanged conical frusta, united by means of adjusting-screws through their flanges, substantially as described.

In testimony that I claim the foregoing I have hereunto set my hand this 2d day of October, 1876.

WILLIAM R. JONES.

Witnesses:
GRAM CURTIS,
WILLIAM WHITE, Jr.